US006424070B1

United States Patent
Spano

(10) Patent No.: US 6,424,070 B1
(45) Date of Patent: Jul. 23, 2002

(54) MAGNETICALLY CENTERING TORQUE MOTOR

(75) Inventor: Dominic Spano, Elma, NY (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 09/638,250

(22) Filed: Aug. 14, 2000

(51) Int. Cl.[7] .................................................. H02K 1/00
(52) U.S. Cl. ......................... 310/179; 310/254; 310/36
(58) Field of Search ................................ 310/179, 216, 310/261, 254, 258, 259, 218, 180, 36, 37, 38

(56) References Cited

U.S. PATENT DOCUMENTS

| | | | |
|---|---|---|---|
| 4,012,653 A | | 3/1977 | Shigeta et al. |
| 4,510,403 A | * | 4/1985 | Vanderlaan et al. ........... 310/36 |
| 4,596,970 A | | 6/1986 | Vanderlaan et al. |
| 4,600,910 A | | 7/1986 | Vanderlaan |
| 4,612,526 A | | 9/1986 | Vanderlaan et al. |
| 4,816,707 A | | 3/1989 | Vanderlaan |
| 5,783,890 A | | 7/1998 | Mulgrave |
| 5,861,699 A | | 1/1999 | Kopac |
| 5,945,761 A | | 8/1999 | Sakuma |
| 6,157,109 A | * | 12/2000 | Schiferl et al. .............. 310/254 |
| 6,169,350 B1 | * | 1/2001 | Yang ........................... 310/216 |
| 6,222,296 B1 | * | 4/2001 | Sakai et al. .................. 310/216 |

* cited by examiner

Primary Examiner—Tran Nguyen
Assistant Examiner—Thanh Lam
(74) Attorney, Agent, or Firm—Phillips, Lytle, Hitchcock, Blaine & Huber LLP

(57) ABSTRACT

The invention is directed to an improved limited torque motor (15). In the preferred embodiment, the motor comprises a magnetized rotor (16) mounted for rotational movement relative to a stator (18), the rotor and stator being elongated about an axis x-x, and the stator having coils (19) adapted to be selectively energized by a current to exert a torque on the rotor, and the stator having a centering magnetic configuration (20) at a first axial location (21) and arranged to produce a torque on the rotor as a function of rotor angular displacement (A), and the stator having a driving magnetic configuration (23) at a second axial location (24) and arranged to produce a torque on the rotor as a function of the current. The stator may comprise multiple radial pole pieces (35) and the coil may be wrapped around each of the pole pieces. The centering magnetic configuration may have less pole-pieces than the driving magnetic configuration. The rotor may have a constant magnetic configuration along its axis. The sum of the axial lengths of the centering configuration and driving configuration may be approximately equal to the axial length of the rotor. The stator may comprise a stack of laminated sections and certain of the laminated sections may be of the driving configuration (42) and certain of the laminated sections may be of the centering configuration (43).

9 Claims, 6 Drawing Sheets

MAGNETICALLY CENTERING TORQUE MOTOR

TECHNICAL FIELD

The present invention relates generally to the field of angular displacement motors and, more particularly, to an improved limited angular magnetically centering torque motor.

BACKGROUND ART

A variety of limited angle torque motors are known in the prior art which include an angular centering function when no torque producing currents are applied. In limited angle torque motors known in the prior art, this angular centering function is achieved by a separate passive magnetic centering mechanism attached to an extension of the motor shaft. However, such configurations result in greater complexity in the design of the motor.

Hence, it would be beneficial to have a torque motor in which the shaft has inherent angular centering characteristics unaided by an independent magnetic centering mechanism.

DISCLOSURE OF THE INVENTION

With parenthetical reference to the corresponding parts, portions or surfaces of the disclosed embodiment, merely for the purposes of illustration and not by way of limitation, the present invention provides an improved limited torque motor (15) having a magnetized rotor (16) mounted for rotational movement relative to a stator (18), the rotor and stator being elongated about an axis (x-x) and the stator having coils (19) adapted to be selectively energized by a current to exert a torque on the rotor.

The improvement comprises the stator having a centering magnetic configuration (20) at a first axial location (21) and arranged to produce a torque on the rotor as a function of rotor angular displacement (A), and the stator having a driving magnetic configuration (23) at a second axial location (24) and arranged to produce a torque on the rotor as a function of the current.

The stator may comprise multiple radial pole pieces (severally indicated at 35) and the coil may be wrapped around each of the pole pieces. The centering magnetic configuration may have less pole-pieces than the driving magnetic configuration. The rotor may have a constant magnetic configuration along its axis. The sum of the axial lengths of the centering configuration and driving configuration may be approximately equal to the axial length of the rotor. The stator may comprise a stack of laminated sections and certain of the laminated sections may be of the driving configuration (42) and certain of the laminated sections may be of the centering configuration (43).

Accordingly, the general object of the present invention is to provide an improved limited angular displacement motor with an inherent angular centering characteristic.

Another object is to provide an improved limited angular displacement motor which does not employ a separate magnet to produce a centering characteristic.

Another object is to provide an improved limited angular displacement motor in which the centering torque is a function of the angular displacement of the rotor.

Another object is to provide an improved limited angular displacement motor which produces torque as a function of current.

Another object is to provide an improved limited angular displacement motor in which the stator has both a centering magnetic configuration and a driving magnetic configuration.

Another object is to provide an improved limited angular displacement motor in which the centering configuration and driving configuration of the stator are approximately equal to the axial length of the rotor.

Another object is to provide an improved limited angular displacement motor in which the stator comprises laminated sections, certain of which provide a driving magnetic configuration and certain of which provide a centering magnetic configuration.

Another object is to provide an improved limited angular displacement motor having constant high torque at its operating current.

Another object is to provide an improved limited angular displacement motor in which the magnetic centering mechanism produces a part of the total driving torque of the motor.

These and other objects and advantages will become apparent from the foregoing and ongoing written specification, the drawings, and the appended claims.

DESCRIPTION OF THE PREFERRED EMBODIMENTS

Figure 1:
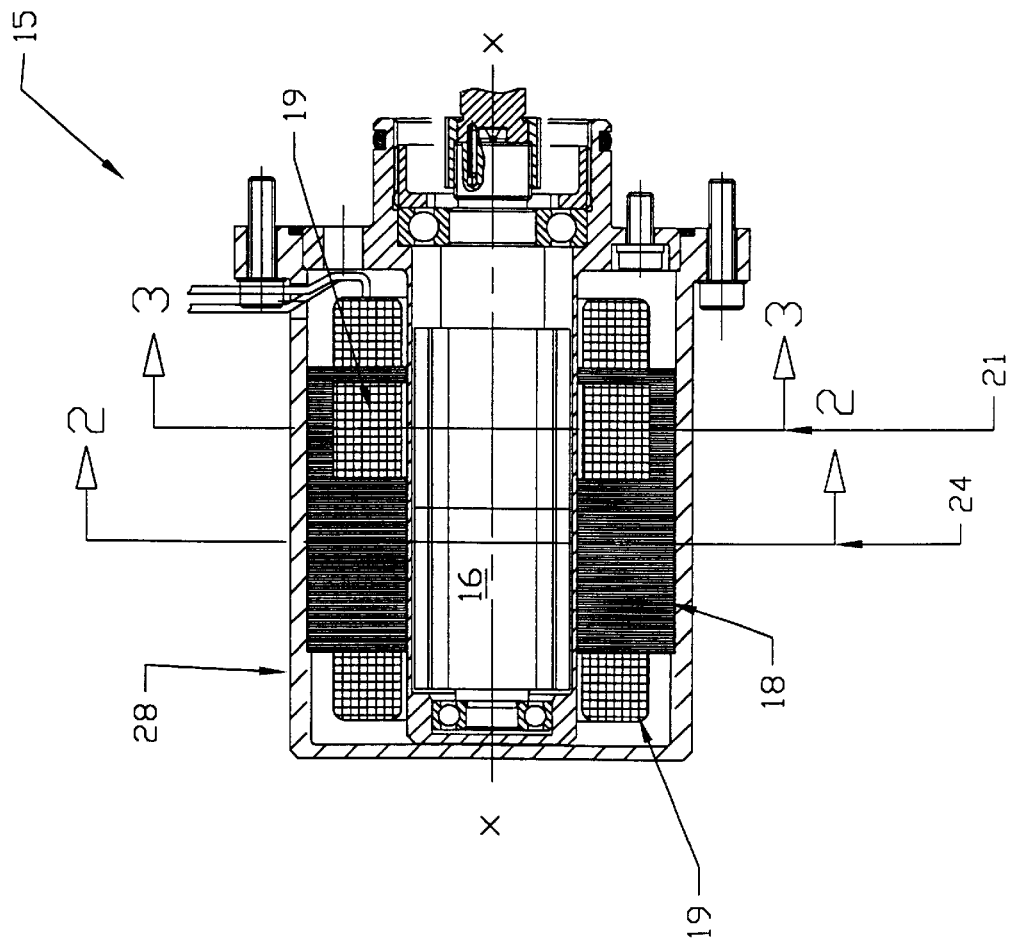
FIG. 1 is a longitudinal vertical sectional view of the improved angular displacement motor.

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings and, more particularly, to FIG. 1 thereof, this invention provides an improved limited angular displacement motor, of which the presently preferred embodiment is generally indicated at 15. Motor 15 is generally a cylindrical structure elongated along longitudinally extending axis x-x. As shown in FIG. 1, motor 15 is shown as broadly including a cylindrical housing 28, which encloses an annular laminated stator 18 and a cylindrical magnetized rotor 16. Stator 18 and rotor 16 are concentric members elongated along axis x-x. Rotor 16 is positioned concentrically within stator 18 for rotation about axis x-x.

Figure 2:
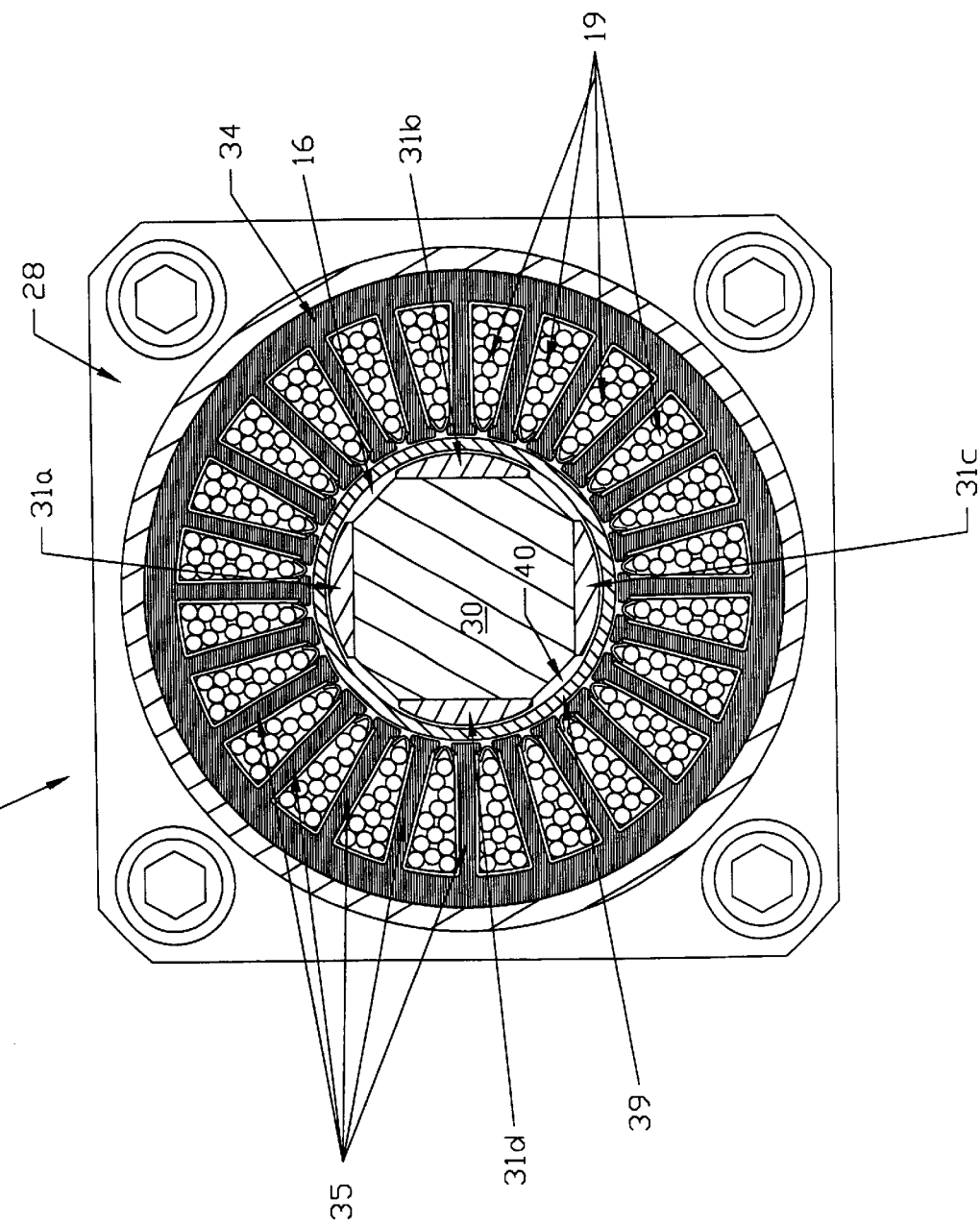
FIG. 2 is a transverse vertical sectional view of the angular displacement motor shown in FIG. 1, taken generally on line 2—2 of FIG. 1.
Figure 3:
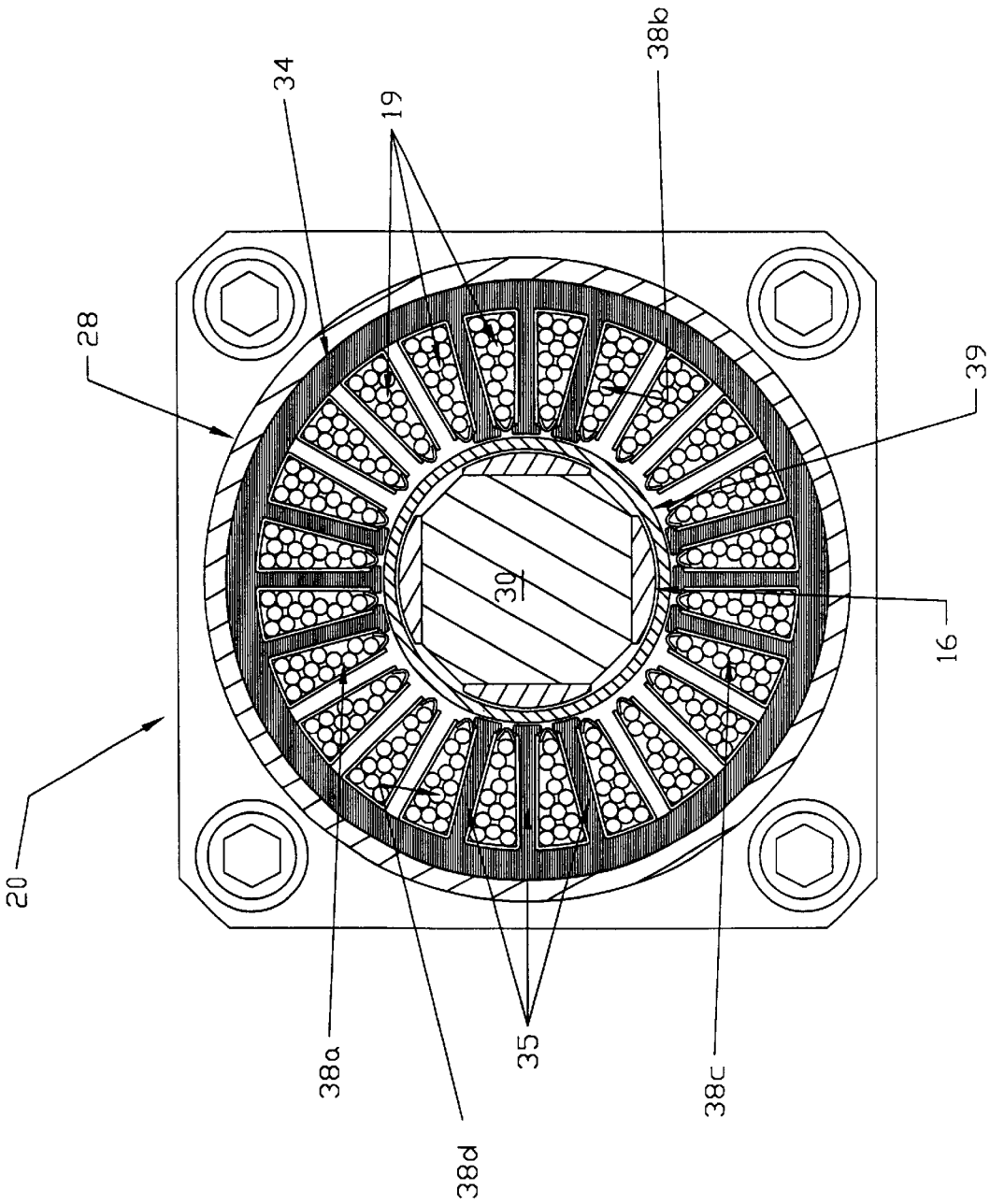
FIG. 3 is a transverse vertical sectional view of the angular displacement motor shown in FIG. 1, taken generally on line 3—3 of FIG. 1.
Figure 4:
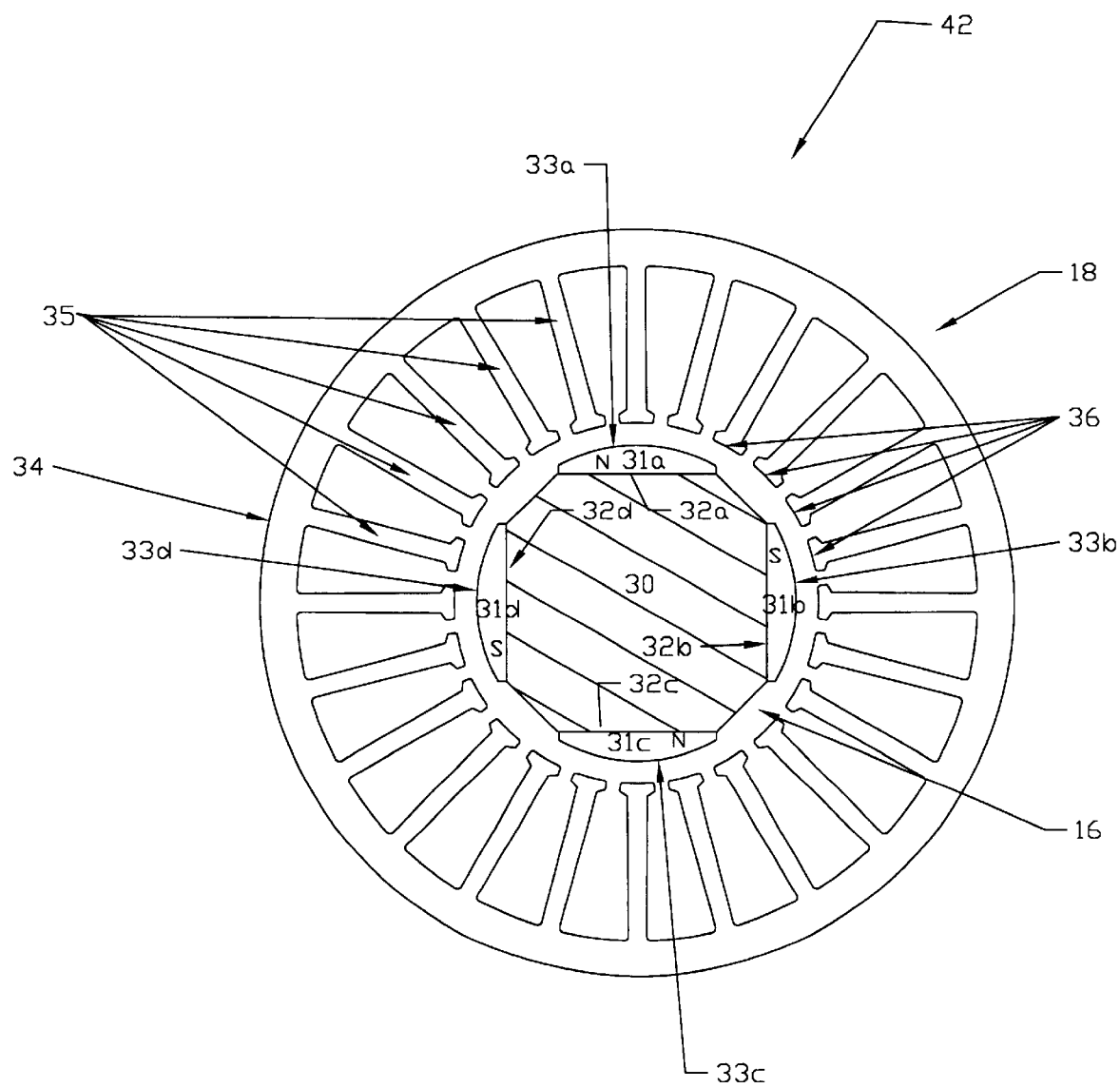
FIG. 4 is a fragmentary view of the stator lamination shown in FIG. 2.

As shown in FIGS. 2–5, in the preferred embodiment rotor 16 comprises a generally octagonal core 30 supporting four equally spaced permanent magnets 31a–31d. Magnets 31a–31d have alternating north-south radial magnetization. As shown in FIG. 4, magnets 31a–31d are arc segments of a cylinder which are bonded to alternate flat surfaces 32a–32d of core 30. Magnets 31a–31d are fixed at equal circumferential increments about core 30 and extend longitudinally along core 30 and are of an equal longitudinal length as core 30. Magnets 31a–31d each have outer arcuate surfaces 33a–33d concentric with axis x-x and spaced radially inward from stator 18. In the preferred embodiment, rotor 16 has a constant cross-section and configuration along the longitudinal length of stator 18.

As shown in FIGS. 2–5, stator 18 comprises an outer cylinder 34 elongated about axis x-x and a plurality of concentrically spaced teeth 35 which extend radially inward from the inner surface of cylinder 34. As shown, teeth 35 have a T-shaped cross section configuration with the base of the T extending radially inwardly from the inner surface of cylinder 34. The top surfaces of the T, which are the most inwardly facing surfaces of teeth 35, severally indicated at 36, form an inner cylindrical stator surface concentric with axis x-x.

As shown in FIGS. 2–3, the preferred embodiment includes a stationary non-magnetic cylindrical sleeve 39 positioned concentrically between outer surfaces 33a–33d of rotor 16 and inner surfaces 36 of stator 18.

One or more coils 19 are wrapped around the teeth 35 of stator 18. Coils 19 extend axially through the interpolar spaces between teeth 35 and wrap around the ends of stator teeth 35. Thus, coils 19 are wrapped circumferentially around teeth 35 with the axis of coils 19 being generally parallel to axis x-x. Accordingly, when stator coils 19 are excited by a current, the stator teeth or poles 35 will cause a cross or transverse flux through stator 18 and rotor 16 which will produce a turning torque on the motor.

In the preferred embodiment, stator 18 comprises a stack of laminations comprised of two configurations, namely, a conventional lamination 42, which in combination act as driving magnetic configuration 23, and a modified lamination 43, which in combination act as centering magnetic configuration 20.

Figure 5:
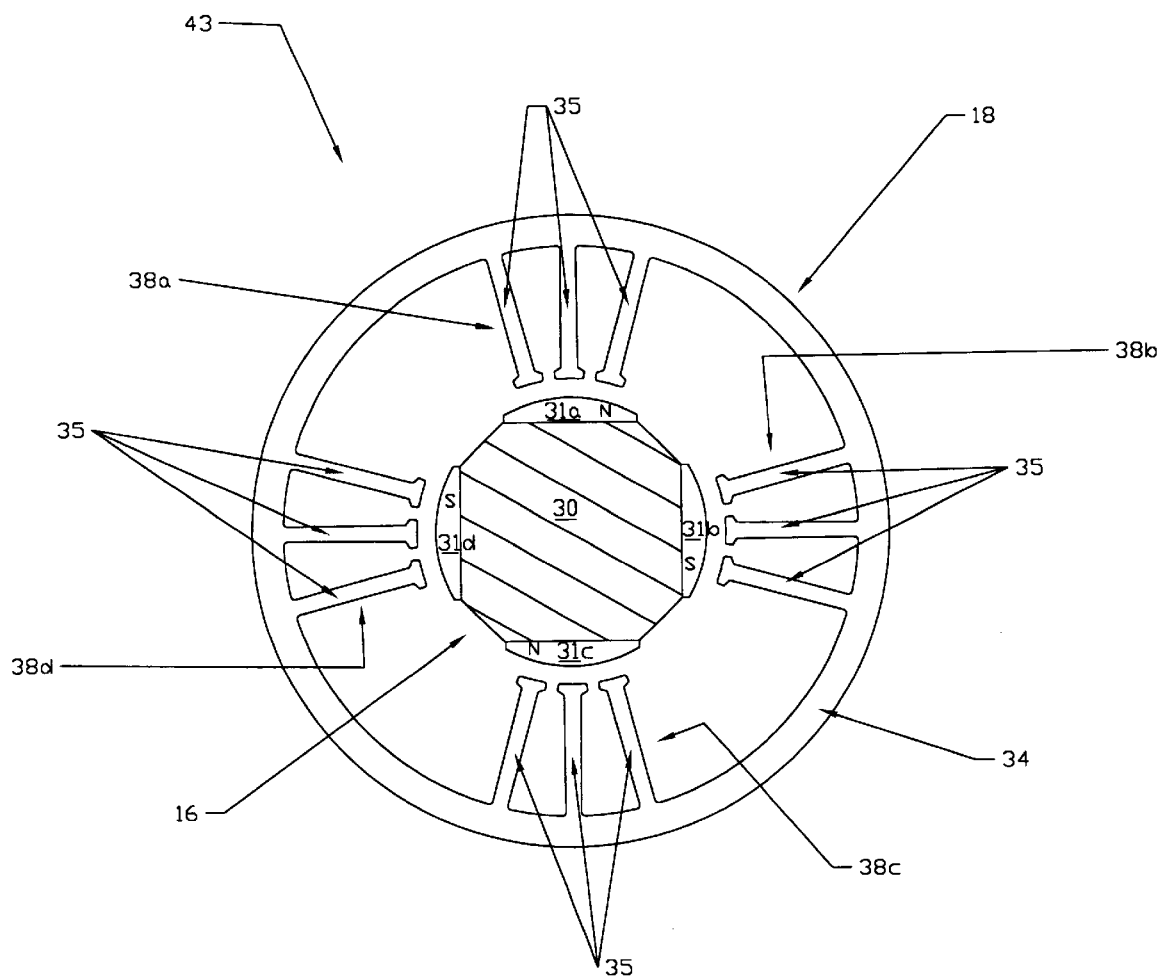
FIG. 5 is a fragmentary view of the stator lamination shown in FIG. 3.

As shown in FIG. 4 and FIG. 5, conventional lamination 42 includes twenty-four teeth, spaced at equal circumferential increments around the inside of cylinder 34. Thus, driving magnetic configuration 23 is made up of a stack of conventional laminations 42, which include all twenty-four teeth 35.

As shown in FIG. 3 and FIG. 5, modified lamination 43 is formed by removing a number of the teeth 35 from conventional lamination 42. As shown in FIG. 5, modified lamination 43 contains four groups 38a–38d of three radial teeth spaced at 90° intervals to each other. Each of the twelve teeth in modified lamination 43 are identically shaped and spaced as those in conventional lamination 42.

As shown in FIG. 1 and FIGS. 2–3, stator 18 is assembled by stacking lengthwise sections of conventional lamination 42 and modified lamination 43. As shown in FIG. 1, the stack of modified laminations 43 are placed between two stacks of conventional laminations 42. Thus, at a first axial location 21, stator 18 has a centering magnetic configuration due to modified laminations 43, and at a second axial location 24, stator 18 has a driving magnetic configuration 23 due to conventional laminations 42.

As shown in FIG. 1, while the stack of modified laminations 43 may be placed at various axial positions along the length of stator 18, in the preferred embodiment they are positioned towards the axial center of stator 18 and away from either longitudinal end of stator 18. In this way, the stacks of conventional laminations 42, which include all twenty-four teeth 35, will support coil windings 19 as they wrap around the ends of the teeth of stator 18.

As shown in FIG. 1 and FIG. 3, coil windings 19 continue through the portion of stator 18 which contains the stack of modified laminations 43. Coil windings 19 pass between the twelve teeth 35 found in the stack of modified laminations 43 and also pass through the spaces between the four groups of teeth 38a–38d.

Figure 6:
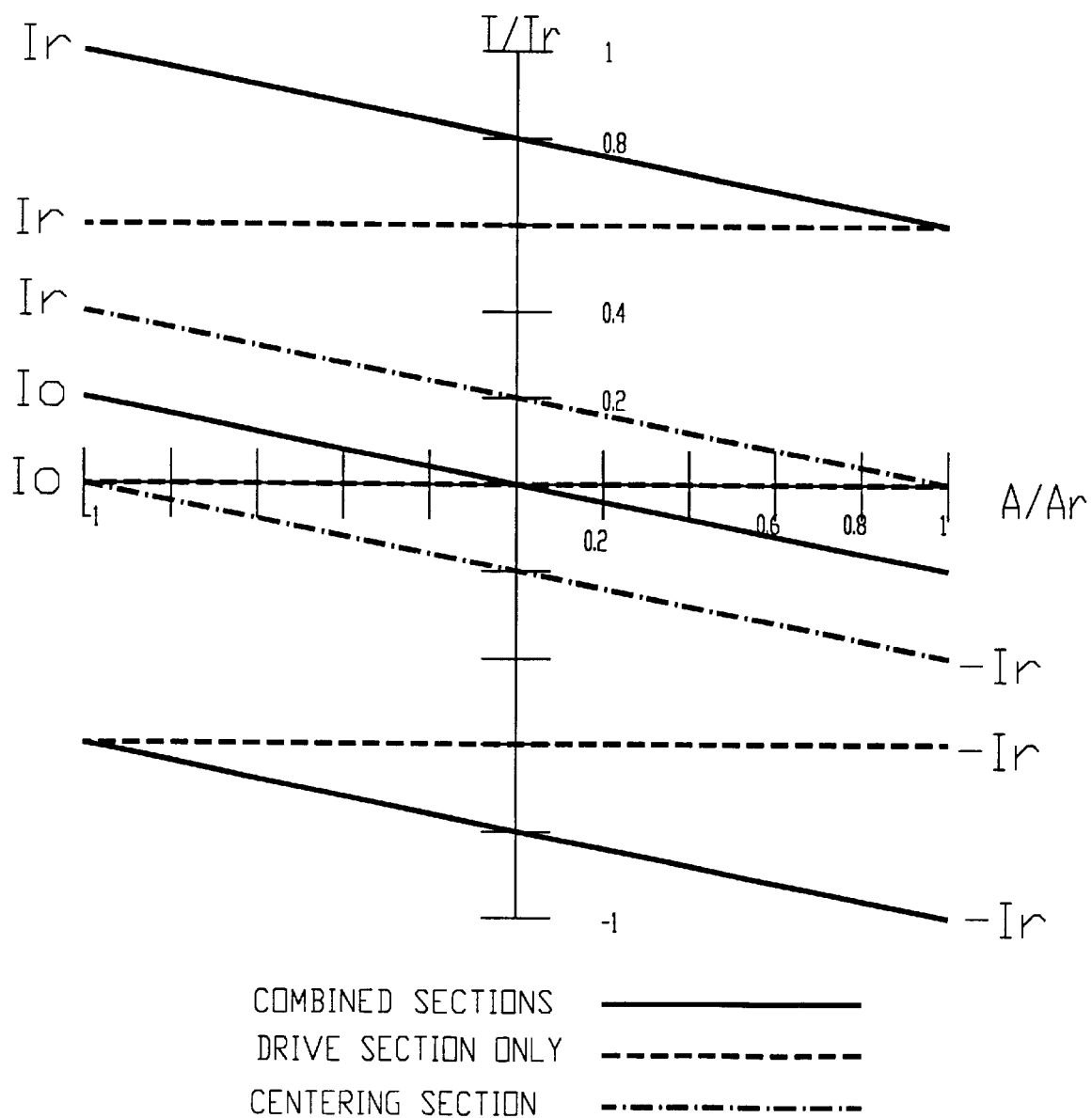
FIG. 6 is a plot of the torque output of the motor as a function of rotor angle for three stator configurations.

FIG. 6 shows a plot of the torque output of a motor as a function of rotor angle. The horizontal axis represents rotor angular displacement A divided by the value of the rated design angle Ar. The vertical axis represents the output torque T divided by the rated design torque Tr. The relative effects of driving magnetic configuration 23 of motor 15, which in the preferred embodiment comprises a stack of modified laminates 43, are illustrated by plots of the calculated performance of motors having only conventional laminations 42 or only modified laminations 43 with axial lengths corresponding to those of rotor 16.

The performance characteristics of a motor with only conventional laminations 42 are shown as dashed lines and are labeled Ir, Io, and -Ir, for current values of design rated, zero, and minus design rated, respectively. As shown, since the torque produced is essentially independent of angle, these plot as horizontal lines which pass through the vertical axis T/Tr at 0.6, 0, and –0.6.

The performance characteristics for a motor with only modified lamination 43 are shown as dashed-dot-dashed-dot lines and are labeled Ir, Io, and -Ir for current values of design rated, zero, and minus design rated, respectively. Since the torque produced is a function of angle, these plot as sloped lines which cross the vertical axis T/Tr at 0.2, 0 and –0.2. As shown, the torque produced for rated design current Ir by only modified laminations 43 at A/Ar=0 is ⅓ of the torque produced by only conventional laminations 42.

The performance characteristics for the combined conventional laminations 42 and modified laminations 43 are shown as solid lines and are labeled Ir, Io, and -Ir for current values of design rated, zero and minus design rated, respectively. These plot as the sum of the conventional and modified section lines, and thus have the same slope as the modified section, and cross the vertical axis T/Tr at values of 0.8, 0 and –0.8.

In contrast to a passive magnetic centering device known in the prior art, which is attached to the motor shaft, the improved mechanism not only provides the desired magnetic centering torque in a more simplified mechanical element, but also produces a significant fraction, approximately twenty-five percent for the above-illustrated case, of the total driving torque of the motor.

The present invention contemplates that many changes and modifications may be made. For example, rotor core 30 may have more or less sides than 8, with a corresponding increase or decrease in the number of magnets, or may have an alternate shape. Magnets 31*a*–31*d* may have different shapes and configurations. The number of teeth 35 may be varied. Therefore, while the presently-preferred form of the motor have been shown and described, and several modifications discussed, persons skilled in the art will readily appreciate that various additional changes and modifications may be made without parting from the spirit of the invention, as defined and differentiated by the following claims.

What is claimed is:

1. In an angular displacement motor having a magnetized rotor mounted for rotational movement relative to a stator, said rotor and stator being elongated about an axis of rotation, said stator having an axial length and coils adapted to be selectively energized by a current so as to cause a torque to be exerted on said rotor, the improvement comprising:

said stator having a first cross-section along a first portion of said axial length;

said stator having a second cross-section along a second portion of said axial length;

said first cross-section being so configured and arranged as to produce a centering torque on said rotor;

said centering torque being a function of the angular displacement of said rotor from a centered position;

said second cross-section being so configured and arranged as to produce a driving torque on said rotor;

said driving torque being a function of said current and being substantially independent of said angular displacement of said rotor from said centered position.

2. The improvement set forth in claim 1, wherein said stator comprises multiple flux conducting radial pole pieces and wherein said coils are wrapped around each of said pole-pieces and elongated parallel to said axis.

3. The improvement set forth in claim 2, wherein said stator has less said pole-pieces along said first portion then along said second portion.

4. The improvement set forth in claim 1, wherein said rotor has an axial length and a constant magnetic configuration along said axial length.

5. The improvement set forth in claim 1, wherein said rotor has an axial length and the sum of the axial lengths of said first portion and said second portion of said stator are approximately equal to said axial length of said rotor.

6. The improvement set forth in claim 1, wherein said stator comprises a stack of laminated sections.

7. The improvement set forth in claim 6, wherein certain of said laminated sections are of said first cross-section and certain of said laminated sections are of said second cross-section.

8. In a limited angular displacement motor having a permanently magnetized rotor mounted for rotational movement relative to a stator, said rotor and stator being elongated about an axis of rotation, said stator having an axial length and coils adapted to be selectively energized by a current so as to cause a torque to be exerted on said rotor, the improvement comprising:

said stator having a first cross-section along a first portion of said axial length;

said stator having a second cross-section along a second portion of said axial length;

said first cross-section being so configured and arranged as to produce a centering torque on said rotor;

said centering torque being a magnetically induced torque which is a function of the angular displacement of said rotor from a centered position;

said second cross-section being so configured and arranged as to produce a driving torque on said rotor;

said driving torque being a magnetically induced torque which is a function of said current.

9. The improvement set forth in claim 8, wherein said permanently magnetized rotor comprises at least one permanent magnet.

* * * * *